Aug. 1, 1961

E. EBERHARD 2,994,838

RELAXATION OSCILLATORS

Filed Jan. 4, 1949

INVENTOR
EVERETT EBERHARD
BY H. D. Newton
ATTORNEY

United States Patent Office 2,994,838

Patented Aug. 1, 1961

2,994,838

RELAXATION OSCILLATORS

Everett Eberhard, Haddonfield, N.J., assignor to Radio Corporation of America, a corporation of Delaware Filed Jan. 4, 1949, Ser. No. 70,661
25 Claims. (Cl. 331—111)

This invention relates generally to relaxation oscillators, and particularly relates to self-oscillating or triggered oscillators including a three-electrode semi-conductor device for developing pulses or saw-tooth waves.

The three-electrode semi-conductor is a recent development in the field of electronic amplification. This device is presently known as a "transistor," and its essential characteristics have been disclosed in a series of three letters to the Physical Review by Bardeen and Brattain, Brattain and Bardeen, and Shockley and Pearson which appeared on pages 230 to 233 of the July 15, 1948, issue. The new amplifier device includes a block of semi-conducting material such as silicon or germanium which is provided on one of its surfaces with two closely adjacent point electrodes which are called "emitter" and "collector" electrodes and with a third electrode, called the "base" electrode, providing a large-area low-resistance contact with another surface of the semi-conductor. The input circuit of the amplifier described in the letters referred to above is connected between the emitter and the base electrodes while the output circuit is connected between the collector and the base electrodes. In this circuit the base electrode is the common input and output electrode and may, therefore, be grounded.

It has been found that a three-electrode semi-conductor behaves as a negative resistance device under certain operating conditions so that current amplification may take place. In other words, the output current may be larger than the input current of the device provided the operating potentials impressed on the three electrodes have certain values. In accordance with the present invention the negative resistance characteristic of a three-electrode semi-conductor is utilized to provide a relaxation oscillator which does not require an external feedback path between the output and the input terminals of the oscillator.

It is the principal object of the present invention, therefore, to provide novel relaxation oscillators including three-electrode semi-conductor devices which do not require an external feedback path between the output and input terminals of the oscillator.

Another object of the invention is to provide relaxation oscillators utilizing transistors which may be made to be self-oscillating or which may be triggered to initiate each cycle of operation, the nature of the operation depending on the applied bias voltage. Furthermore, when operated as a continuous or as a triggered oscillator either a sawtooth or a square topped wave may be derived.

A further object of the invention is to provide relaxation oscillators which make use of the inherent negative resistance characteristic of a three-electrode semi-conductor whereby current amplification takes place when the voltages applied to the three electrodes reach certain values.

A relaxation oscillator may conventionally comprise a charge storage device, such as a capacitor, which is charged at a predetermined relatively slow rate by a source of potential through a resistor. The capacitor is then suddenly discharged by a suitable device to develop a saw-tooth wave across the capacitor. In accordance with the present invention a capacitor is periodically and suddenly discharged by means of a three-electrode semi-conductor having a base electrode of relatively large area and an emitter and a collector electrode of relatively small area. The capacitor is connected in series with an impedance element, such as a resistor, between the base electrode and the collector electrode. A predetermined bias potential is then applied between the base and emitter electrodes. When this potential is of such a magnitude and polarity that current flows between the base and emitter electrodes, the system will be self-oscillating. Thus, after the capacitor is charged to a certain critical potential, it will be suddenly discharged through the electrodes of the semi-conductor, whereupon the next cycle of operation begins.

However, if the normal potential applied between the base and emitter electrodes is below the value required to initiate the flow of current between these electrodes, the oscillator must be triggered. Then the trigger pulses may be applied either to the emitter electrode with respect to the base or pulses of opposite polarity may be applied to the base electrode with respect to the emitter. The applied pulses will then initiate a large current flow between the emitter and base electrodes and the three-electrode semi-conductor will operate as a current amplifier, the amplified output current being supplied by the discharge of the capacitor which has been previously charged. The relaxation oscillator of the invention may also be utilized as a frequency divider.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1:
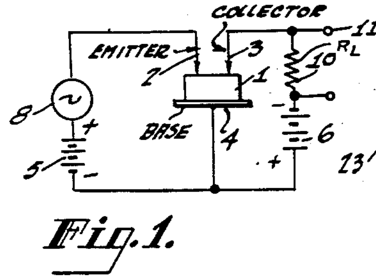
FIG. 1 is a circuit diagram of a known three-electrode semi-conductor amplifier.

Referring now to the drawing, in which like components have been designated by the same reference numerals, and particularly to FIG. 1 there is illustrated a previously known three-electrode semi-conductor device arranged as an amplifier. The amplifier comprises a block 1 of semi-conducting material which may consist, for example, of germanium or silicon containing a small but sufficient number of atomic impurity centers or lattice imperfections as are commonly employed for best results in crystal rectifiers. Germanium is the preferred material for block 1 and, as will be further explained below, may be prepared so as to be an electronic N type semi-conductor. The surface of semi-conducting block 1 may be polished and etched in the manner explained in the paper by Bardeen and Brattain referred to. It is also feasible to utilize the germanium block from a commercial high-back-voltage germanium rectifier such as the 1N34 type for semi-conductor 1 and, in this case, further surface treatment may not be required. Semi-conductor 1 is provided with three electrodes, viz. emitter electrode 2, collector electrode 3 and base electrode 4 as indicated in FIG. 1. Emitter electrode 2 and collector electrode 3 may be point contacts which may consist, for example, of tungsten or Phosphor bronze wires having a diameter of the order of 2 mils. The emitter and collector electrodes 2, 3 are ordinarily placed closely adjacent to each other and may be separated by a distance of from 2 to 10 mils. Base electrode 4 provides a large-area low-resistance contact with the bulk material of semi-conductor 1.

A suitable voltage source such as battery 5 is connected between emitter electrode 2 and base electrode 4 and is of such a polarity as to bias them in a relatively conducting direction or polarity. Accordingly, when the semi-conductor is of the N type, the emitter electrode 2 should have a positive voltage with respect to base electrode 4 as illustrated. Another voltage source such as battery 6 is provided between collector electrode 3 and base electrode 4 and has such a polarity as to bias them in a relatively non-conducting direction or polarity. Consequently, since an N-type semi-conductor is assumed for FIG. 1, collector electrode 3 should have a negative voltage with respect to base electrode 4. The source of the input signal indicated at 8 is connected in the emitter lead, that is, between emitter electrode 2 and base electrode 4. The output load $R_L$ indicated by resistor 10 is provided between collector electrode 3 and base electrode 4 and is in series with bias battery 6. The output signal may be derived across load resistor 10 from output terminals 11.

At the present time it is not possible to give a definite theory accounting for all details of the operation of the three-electrode semi-conductor amplifier. It is believed, however, that the following explanation will be helpful for a better understanding of the present invention. A semi-conductor is a material whose electrical conductivity lies intermediate between that of the best conductors and that of the best insulators. Although conduction in some materials may be ionic in nature, so that the actual motion of electrically charged atoms represents the flow of current, the present invention is of particular value in connection with those materials in which the atoms remain relatively fixed while conduction takes place by electrons. These latter materials are called electronic semi-conductors. It is appreciated that ionic conductors can also be of use in amplifier devices so that, although the discussion and explanation of operation is confined to electronic semi-conduction of the type found for example in silicon or germanium, the invention is not to be construed as so limited. For some time it has been assumed that there are two types of such electronic semi-conductors, one called the N type (negative type) while the other is called the P type (positive type). The N type semi-conductor behaves as if there were present a limited number of free negative charges or electrons which conduct the current somewhat similar to the manner in which current conduction takes place in a metal. Such material, in a well-ordered crystal lattice, would not be expected to have many free electrons. It is therefore assumed that the free electrons which account for the conduction are donated by impurities or lattice imperfections which may be termed "donors." Thus, in an N type silicon crystal which is a semi-conductor, the donor may consist of small impurities of phosphorus. Since silicon has four valence electrons and phosphorus five, the excess valence electron of the occasional phosphorus atom is not required for the tetrahedral binding to adjacent silicon atoms in the crystal and hence is free to move. The current in an N type semi-conductor accordingly flows as if carried by negative charges (electrons).

In the P type of semi-conductor, current conduction appears to take place as if the carriers were positive charges. This is believed to be due to the presence of impurities which will accept an electron from an atom of the semi-conductor. Thus, a P type silicon crystal may contain a few boron atoms which act as "acceptors." Since boron has only three valence electrons, it will accept an electron from a silicon atom to complete the atomic bond. There is, accordingly, a "hole" in the crystalline structure which might be considered a virtual positive charge. Under the influence of an external electrical field the hole or the holes will travel in the direction that a positive charge would travel.

If two contacts are made to an electronic semi-conductor of N or P type, and if these contacts are similar in nature and of equal area, an impressed voltage will lead to current flow of about the same magnitude with either polarity of voltage. However, it will ordinarily be found that there is a non-linear relation between current and voltage, as the latter is increased. This non-linear effect was first explained to be a result of the disturbance of the internal electronic energy levels of the crystal lattice due to the metal contact which was said to produce a so-called barrier layer, or energy hump. It could be shown that, with an N-type crystal, an increasing positive potential on the metal contact caused a change in the barrier-layer energy hump in such a direction as to allow electrons to flow relatively freely into the metal. A metal contact having a negative potential, however, would alter the field so as to repel the internal conduction electrons, and the only current flow would then be due to the escape of electrons from the metal over the energy hump of the barrier layer; this current flow would be quite small. The explanation was sufficient to explain crudely the observed phenomena as well as those with P-type material, in which the effects are similar with the opposite polarity of metal contact. Although as indicated, there is a hypothetical rectification effect at the contact to either N or P type material, the two equal contacts will cancel out this effect and the current flow is independent of polarity and relatively small.

In the actual two-electrode rectifier (crystal diode), one contact is made to the bulk crystal and is of such large area that its resistance is extremely low for either direction of current flow. Thus, non-linear effects at this large-area contact are not of great significance compared with those at the second contact, which is of very small area (such as that of a wire having a sharp point). In this way, the hypothetical barrier layer at the crystal surface near the small-area contact can cause actual rectification. As already indicated, such an unequal contact area device made of an N-type semi-conductor will conduct readily when the small-area contact is positive in polarity and is relatively non-conducting when the small area contact is negative. For a two-electrode rectifier made of a P-type material the situation is reversed.

In the semi-conductor amplifier of three-electrodes, one large-area contact is used to the bulk crystal and two smaller-area contacts are used close to one another on a crystal surface. There are now two possible barrier layers but, even more important, it is believed that current may now flow from one small-area contact to the other one in a way requiring a much more correct explanation of the barrier-layer effect than the one involving only the presence of the metal contact. This will be discussed below in connection with N-type material but it is to be understood that analogous effects may occur with P-type material by appropriate reversal of potentials just as in the rectifier case.

The recently discovered amplifying properties of the three-electrode semi-conductor may be explained on the basis of a proposed theory as follows: The germanium or silicon crystal used in the device is an N type semi-conductor throughout its bulk. However, a very thin surface layer of the crystal may behave like a P type semi-conductor. This thin layer of P type, that is, "hole," conduction may be caused by a chemical or physical difference in the behavior of the impurities, on the surface of the crystal, or it may be caused by a change in the energy levels of the surface atoms due to the discontinuity of the crystal structure at the surface. In any case, an excess of holes is created in this surface layer of the semi-conductor. Originally, it has been believed that a barrier layer existed near the metal point contact of a crystal rectifier of the high-back-voltage germanium or silicon type. When the potential of a point contact consisting of the correct metal was made positive, the electric field between point contact and crystal would lower such a barrier as viewed from the crystal, and the conduction electrons from an N-type crystal lattice would be enabled to flow readily into the point. A negative potential on the point, however, would reduce conduction because the barrier viewed from the crystal is now higher and because the electrons from the metal would not be able to penetrate the barrier in the crystal in either case. This hypothesis failed to explain the lack of difference in rectification between high and low work function metal contacts and also led to predictions of a higher resistance in the conducting direction than was actually observed. The previous explanation has now been modified by assuming the presence of a surface P-layer on the crystal and furthermore it now seems probable that the rectifying barrier exists near the surface region at the P to N boundary. Thus, differences of the work functions of metallic points play a negligible role in the rectification and the relatively larger barrier area accounts for the low resistance of the crystal in the conducting direction. Furthermore, conduction near the point contact is of the "hole" or virtual positive charge type, while inside the crystal it is of the electron, or negative charge type. For the three-electrode semi-conductor amplifier, under discussion, this new theory is very important since its behavior is chiefly governed by the "hole" current on the surface of the crystal between the two point contacts.

Because the point contact 2 known as the emitter electrode is biased positive with respect to the crystal 1, conduction readily takes place through "holes" moving in the surface layer of the crystal while electrons carry the current in the interior of the crystal. However, since a nearby collector point contact or electrode 3 at a negative potential will cause an electric surface field and attract the positive "holes," the "holes" need not actually flow into or through the crystal barrier layer but may flow directly from emitter electrode 2 to collector electrode 3 along the surface. Changing the voltage between emitter electrode 2 and the bulk crystal 1 will increase or decrease the emitter current available for flow in the P-type surface layer to the collector electrode 3.

Figure 2:
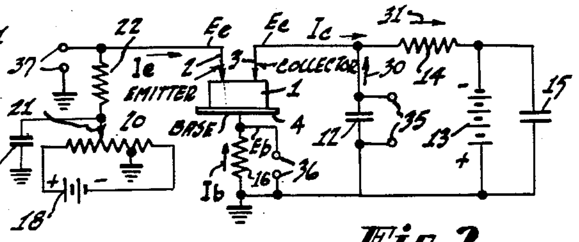
FIG. 2 is a circuit diagram of self-oscillating relaxation oscillator embodying the present invention.

A self-oscillating relaxation oscillator in accordance with the invention is illustrated in FIG. 2. The oscillator comprises a charge storage device such as capacitor 12 which is charged at a relatively slow rate by a suitable source of potential such as battery 13 connected in series with resistor 14 across capacitor 12. Battery 13 may be bypassed for currents at the oscillatory frequency by bypass capacitor 15.

Capacitor 12 is periodically and suddenly discharged by the three-electrode semi-conductor including semi-conducting material 1 provided with emitter electrode 2, collector electrode 3 and base electrode 4. Base electrode 4 is connected to ground, that is, to a point of fixed reference potential through an impedance element such as resistor 16. Capacitor 12 is connected between ground, that is, between the grounded terminal of resistor 16 and collector electrode 3. Battery 13 is effectively connected between base electrode 4 and collector electrode 3 in such a polarity as to bias base electrode 4 and collector electrode 3 in a relatively non-conducting polarity. Thus, assuming that semi-conducting material 1 consists of a germanium crystal which is an n type semi-conductor having a P type surface layer, collector electrode 3 should have a negative potential with respect to base electrode 4 as shown in FIG. 2. Capacitor 12 is accordingly charged slowly by battery 13 so that the potential of collector electrode 3 become increasingly more negative with respect to ground.

Another source of potential such as battery 18 is connected effectively between emitter electrode 2 and base electrode 4. Potentiometer 20 is connected across battery 18. An intermediate point of potentiometer 20 is grounded as shown and adjustable tap 21 is connected to emitter electrode 2 through resistor 22. Battery 18 may be bypassed for currents at the oscillatory frequency by bypass capacitor 23 connected between tap 21 and ground. By varying tap 21 the voltage applied to emitter electrode 2 can be adjusted. In order to provide a self-oscillating relaxation oscillator the voltage applied to emitter electrode 2 should be such as to bias base electrode 4 and emitter electrode 2 in a relatively conducting polarity, that is, to apply the bias voltage so that current will flow between these electrodes.

Figure 3:
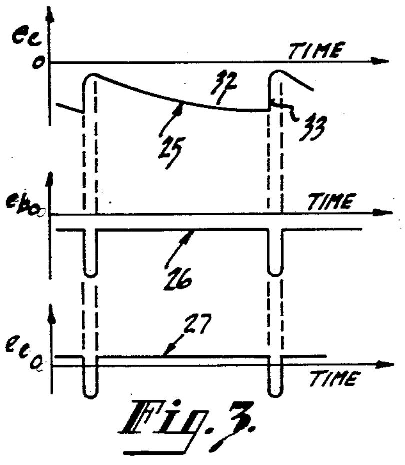
FIG. 3 is a graph illustrating certain voltages which will be referred to in explaining the operation of the oscillator of FIG. 2.

The operation of the oscillator of FIG. 2 may be better understood by reference to the curves of FIG. 3. Thus, curve 25 illustrates the instantaneous collector voltage $e_c$ plotted with respect to time. Curve 26 illustrates the instantaneous base voltage $e_b$ while curve 27 shows the instantaneous emitter voltage $e_e$ both being plotted with respect to time. Let it now be assumed that capacitor 12 has been previously discharged and is now slowly charged from battery 13 through resistor 14. The conventional direction of the current flow has been indicated by arrows 30 and 31 from capacitor 12 through resistor 14 to battery 13. Accordingly, the voltage $e_c$ which is the voltage across capacitor 12, will slowly increase in a negative direction as shown by portion 32 of curve 25. During this time a small amount of current will flow through semi-conductor 1. The emitter current $I_e$, the collector current $I_c$ and the base current $I_b$ and their conventional directions of flow have been indicated in FIG. 2. The amount of current flowing through semi-conductor 1 will be comparatively small because collector electrode 3 is not sufficiently negative to attract all the virtual positive charges supplied by emitter electrode 2. The base current $I_b$ flowing during this time will make base electrode 4 slightly negative as shown by curve 26. At the same time the emitter electrode 2 is maintained at a slightly positive potential with respect to ground by battery 18 as indicated by curve 27.

Eventually, capacitor 12 and consequently collector electrode 3 will acquire such a negative potential with respect to ground that the three-electrode semi-conductor now behaves like a negative resistance device. Under those conditions the collector current $I_c$ will be considerably larger than the emitter current $I_e$ so that current amplification takes place. It is to be understood that generally a three-electrode semi-conductor may also be operated as a voltage amplifier even if no current amplification takes place, provided that the input impedance is smaller than the output impedance.

As soon as the voltages applied to the three electrodes 2, 3 and 4 are such that the dynamic characteristic relating the emitter voltage to the base current has a negative slope, capacitor 12 is suddenly discharged. In other words, the base current $I_b$ begins to increase so that the voltage of base electrode 4 becomes more negative. Consequently, the potential between emitter electrode 2 and base electrode 4 increases which, in turn, will cause more base current to flow. Resistor 16 accordingly introduces regeneration as soon as the current amplification exceeds unity. In view of the larger current which now suddenly flows through resistor 16 the voltage of base electrode 4 decreases suddenly as shown by curve 26. Simultaneously, the large emitter current flowing through resistor 22 causes the emitter voltage, illustrated by curve 27, to decrease suddenly in a negative direction. The result is that the collector current $I_c$ will flow into capacitor 12 to discharge it suddenly. The voltage of collector electrode 3 accordingly increases suddenly in a positive direction as shown by portion 33 of curve 25. These comparatively heavy currents continue until capacitor 12 is discharged.

It will now be obvious from an inspection of FIG. 3 that a saw-tooth voltage wave of the type illustrated at 25 may be obtained from output terminals 35 connected across capacitor 12. Square-topped pulses having a negative polarity such as illustrated at 26 may be derived from output terminals 36 connected across resistor 16. Finally, another series of negative square-topped pulses such as illustrated at 27 may be obtained from output terminals 37 connected between emitter electrode 2 and ground, that is, the pulses are derived effectively across resistor 22. The repetition rate of the pulses 26, 27 or of the saw-tooth wave 25 is determined essentially by the capacitance of capacitor 12 and the resistance of resistor 14. The width of pulses 26 or 27 is controlled essentially by the capacitance of capacitor 12 and by the resistance of resistors 16 and 22. In other words, the rate at which capacitor 12 is charged determines when the capacitor reaches the point of discharge, that is, it determines the frequency of the saw-tooth wave 25 or of the pulses 26 or 27. On the other hand, the width of the pulses is determined by the rate at which capacitor 12 is suddenly discharged through the resistance of resistors 16 and 22 and through the negative resistance which the three-electrode semi-conductor exhibits.

Resistor 22 is not essential to the operation of the oscillator of FIG. 2 and may therefore be omitted. However, resistor 22 may serve the function of limiting the emitter current $e_b$ and it controls the pulse width as explained hereinabove. Furthermore, resistor 22 has a certain degenerative action due to the fact that it limits the discharge current of capacitor 12.

By way of example, bypass capacitor 15 may have a capacitance of one microfarad while that of bypass capacitor 23 may amount to 4 microfarads. Capacitor 12 may have a capacitance of .002 microfarad. Resistor 14 may have a resistance of 15,000 ohms while that of resistors 16 and 22 may be 2700 and 48 ohms respectively. With the above circuit constants a repetition frequency of 50 kilocycles (kc.) of pulses 26 and 27 and of saw-tooth wave 25 was obtained. The oscillatory frequency is somewhat higher than would be expected from the time constants of capacitor 12 and resistor 14. This indicates that capacitor 12 may not be fully charged before it is discharged again. Furthermore, with the above circuit constants, the width of pulses 26 and 27 is 3.5 micro-seconds. This pulse width is somewhat less than can be accounted for considering only the values of capacitor 12 and resistor 16 (the resistance of resistor 22 is negligible). However, this effect would normally be expected since some of the discharge current passes from the collector electrode to the emitter electrode and through resistor 22 to ground. Calculations from the observed pulse width show that resistor 22 in series with the internal collector-to-emitter resistance gives an approximate negative resistance of 1000 ohms.

Figures 4, 6:
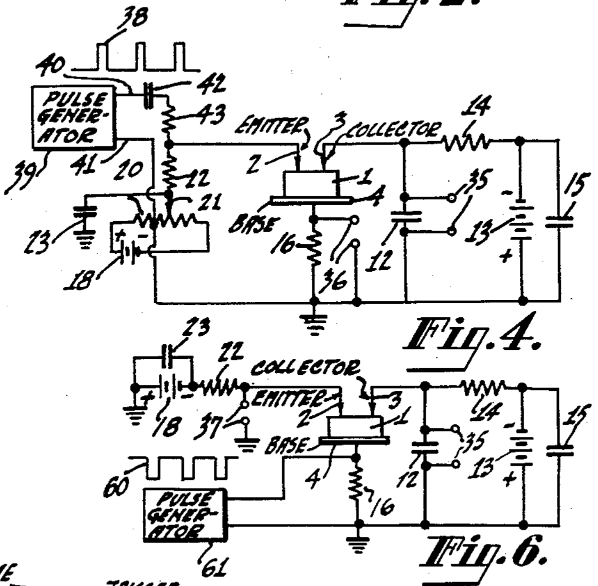
FIG. 4 is a circuit diagram of a triggered relaxation oscillator in accordance with the invention.
FIG. 6 is a circuit diagram of a modified triggered oscillator in accordance with the present invention.

It is also feasible to provide a relaxation oscillator which is not self-oscillating and which must therefore be triggered. Such a triggered relaxation oscillator in accordance with the present invention is illustrated in FIG. 4. The oscillator of FIG. 4 differs from that of FIG. 2 principally by reason of the fact that variable tap 21 is in such a position that a negative voltage is impressed through resistor 22 on emitter electrode 2. As will be more fully explained hereinafter, this will prevent the oscillator from oscillating when it is not triggered. The oscillator is triggered by means of trigger pulses, illustrated at 38 in FIG. 4, developed by pulse generator 39. Trigger pulses 38 are of positive polarity as illustrated. Pulse generator 39 is provided with output terminals 40 and 41. Output terminal 40 is coupled to emitter electrode 2 through coupling capacitor 42 and resistor 43. Resistors 43 and 22, therefore, function as a voltage divider for the applied pulses. Output terminal 41 is grounded as illustrated and may be connected to the grounded intermediate point of potentiometer 20.

Figure 5:
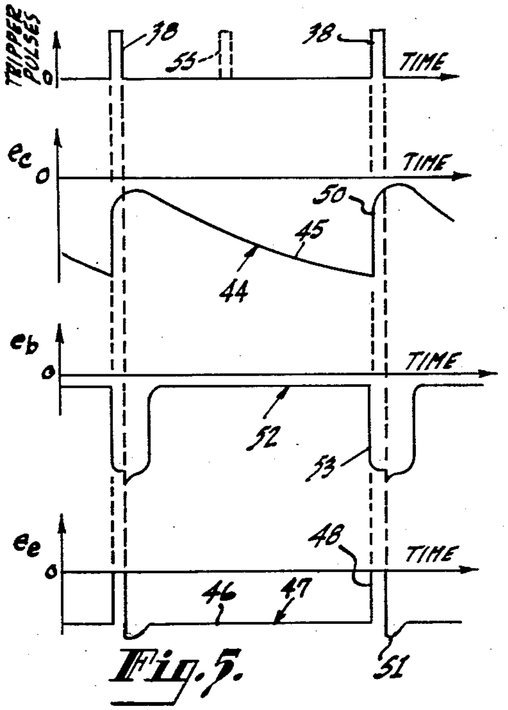
FIG. 5 is a graph illustrating voltages which will be referred to in explaining the operation of the triggered oscillator of FIG. 4.

The operation of the triggered relaxation oscillator of FIG. 4 may best be understood by reference to FIG. 5. Curve 44 of FIG. 5 illustrates the instantaneous collector voltage $e_c$ with respect to time. Let it be assumed that capacitor 12 has previously been discharged. Accordingly, the capacitor is now slowly charged from battery 13 through resistor 14 to a negative potential as indicated by curve portion 45 of curve 44. However, even if the potential across capacitor 12, that is, the instantaneous potential of collector electrode 3 becomes quite negative, capacitor 12 cannot be discharged. This is due to the fact that emitter electrode 2 has impressed thereon a negative potential as indicated by curve portion 46 of curve 47 (FIG. 5) illustrating the emitter voltage $e_e$. Accordingly, emitter electrode 2 cannot emit the virtual positive charges which are essential for the operation of a three-electrode semi-conductor.

However, when a trigger pulse 38 of postive potential is now impressed on emitter electrode 2, its potential will rise as illustrated by curve portion 48 of curve 46. This, in turn, will permit current to flow between emitter electrode 2 and collector electrode 3. At the same time the base current flowing through resistor 16 will increase. The three-electrode semi-conductor now operates as a negative resistance device in the manner previously explained so that capacitor 12 is rapidly discharged as shown by curve portion 50 of curve 44. At the termination of trigger pulse 38 the emitter potential shown by curve portion 51 of curve 47 goes more negative than it was previously due to the last portion of the discharge of capacitor 12. The instantaneous base voltage $e_b$ illustrated by curve 52 will normally be slightly negative with respect to ground as long as capacitor 12 is charged. When capacitor 12 is suddenly discharged in the manner just described, a heavy base current is drawn which will cause the instantaneous base voltage to go negative as illustrated by curve portion 53 of curve 52. As shown in FIG. 5 capacitor 12 may continue to discharge through base resistor 16 after the termination of the trigger pulse 38.

It will accordingly be seen that a saw-tooth wave of the type illustrated by curve 44 may be derived from output terminal 35 across capacitor 12. Furthermore, pulses of negative polarity as illustrated by curve 52 may be derived from output terminals 36 across base resistor 16. The repetition rate of output pulses 52 and of saw-tooth wave 44 is determined by the repetition rate of trigger pulses 38. The width of pulses 53 is controlled by the capacitance of capacitor 12 and by the resistance of resistors 16 and 22.

By way of example, the triggered relaxation oscillator of FIG. 4 may have the following circuit constants:

| | | |
|---|---|---|
| Resistor **43** | ohms | 480 |
| Resistor **22** | do | 48 |
| Resistor **16** | do | 2,700 |
| Resistor **14** | do | 47,000 |
| Capacitor **12** | microfarads | .002 |
| Capacitor **15** | do | 1 |
| Capacitor **23** | do | 4 |
| Battery **13** | volts | 45 |

With the above circuit constants the collector bias voltage $E_c = -10$ volts and the emitter bias voltage $E_e = -1.9$ volts. The average collector current $I_c = .76$ milliampere (ma.) and the average emitter current $I_e = .04$ ma. The peak voltage of pulses 53 is of the order of .5 volt and that of saw-tooth wave 44 is 3.6 volts. The width or duration of pulses 53 is 3.5 micro-seconds. Stable operation was obtained with a width of trigger pulses 38 of 1 micro-second.

It is also feasible to synchronize the self-oscillating relaxation oscillator of FIG. 2. To that end the circuit of FIG. 4 could be utilized provided that tap 21 is adjusted so that a positive bias voltage is applied to emitter electrode 2. The relaxation oscillator will then be self-oscillating and may be synchronized by pulses 38 provided the pulses occur a short instant before the oscillator is ready to discharge capacitor 12.

It has been found that the oscillator of FIG. 2 will oscillate at frequencies above 150 kc. The oscillator will, of course, readily oscillate at lower frequencies. It has also been observed that in some cases there may be a small delay of approximately one-quarter micro-second between the occurrence of the leading edge of a trigger pulse 38 and the initiation of the discharge of capacitor 12. This is probably due to the transit time of the electrical charges of a three-electrode semi-conductor.

The triggered relaxation oscillator of FIG. 4 may also be utilized as a frequency divider. Thus, a trigger pulse such as shown at 55 in FIG. 5 will be unable to trigger the oscillator to discharge capacitor 12. This is due to the fact that at that instant the instantaneous collector voltage illustrated by curve portion 45 is insufficient to cause current amplification. However, as soon as the instantaneous collector voltage becomes sufficiently negative a trigger pulse will be able to initiate the discharge of capacitor 12. Thus, by proper choice of the circuit constants the circuit of FIG. 4 may be utilized as a frequency divider. In other words, if it is desired to divide the frequency of the trigger pulses by the factor $n$, every $n$th pulse should arrive when capacitor 12 has been sufficiently charged. In the same manner the circuit of FIG. 2 may be utilized as a frequency divider provided the free running frequency of the oscillator is a fraction of the trigger frequency. Thus, by way of example, the frequency of the trigger pulses may be three times the free running frequency of the oscillator. The circuit of FIG. 4 may also be used as a triggered relay. The relay will be responsive to a first trigger pulse but will ignore a succeeding pulse arriving within a predetermined time period, that is, before the circuit is ready again to be triggered.

It is also feasible to provide a triggered relaxation oscillator where trigger pulses 60 of negative polarity are applied to base electrode 4 as illustrated in FIG. 6. The negative trigger pulses 60 are developed by pulse generator 61 having its output terminals connected across base resistor 16. The circuit of FIG. 6 operates substantially in the same manner as that of FIG. 4. It will be obvious from the above explanation that a reduction in the instantaneous base voltage is equivalent to an increase of the instantaneous emitter voltage.

Figure 7:
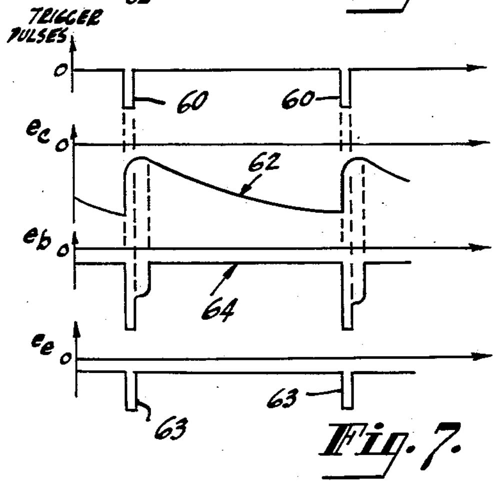
FIG. 7 is a graph illustrating voltages which will be referred to in explaining the operation of the triggered oscillator of FIG. 6.

A saw-tooth wave such as shown at 62 in FIG. 7 may be obtained from output terminals 35 of capacitor 12. Pulses such as shown at 63 (FIG. 7) may be derived across resistor 22 from output terminals 37. The instantaneous base voltage is illustrated by curve 64 of FIG. 7.

There has thus been described a relaxation oscillator utilizing a three-electrode semi-conductor. The oscillator may either be free running, it may be synchronized, or it may be triggered. Furthermore, either an output saw-tooth wave or output pulses may be derived from the oscillator. The relaxation oscillator of the invention may also be used as a frequency divider in which case the oscillator may either be arranged to be self-oscillating or to be triggered. The oscillator of the invention may simply be changed from free running operation to triggered operation by varying the bias voltage applied to one of its electrodes.

What is claimed is:

1. A device of the character described comprising a charge storage device, means for charging said storage device at a predetermined rate; and means including a semi-conducting material provided with a first electrode of relatively large area and with a second electrode and an output electrode each of relatively small area for discharging said storage device, said storage device being connected effectively between said first electrode and said output electrode.

2. A device of the character described comprising a charge storage device, means including a source of potential and a resistive impedance element for charging said storage device at a predetermined rate; and means including a semi-conducting material provided with a first electrode of relatively large area and with a second electrode and an output electrode each of relatively small area for discharging a further impedance element connected in series with said storage device, the free end of said impedance element being connected to said first electrode, the free end of said storage device being connected to said output electrode, said further electrodes, and means for impressing a predetermined bias potential between said first electrode and said output electrode.

3. A device of the character described comprising a charge storage device, means including a source of potential for charging said storage device at a predetermined rate; and means comprising a semi-conducting material provided with a first electrode of relatively large area and with a second electrode and an output electrode each of relatively small area for discharging said storage device, an impedance element connected to said first electrode, said storage device being connected between said impedance element and said output electrode, and means for impressing a predetermined bias potential between said first electrode and said second electrode.

4. A device of the character described comprising a semi-conducting material provided with a first electrode of relatively large area and with a second and an output electrode of relatively small area, a first resistive impedance element connected to said first electrode, a charge storage device connected between the free terminal of said first element and said output electrode, means including a first source of voltage and a second resistive impedance element for charging said storage device, and a second source of voltage connected between said free terminal and said second electrode for impressing a predetermined bias voltage between said first and second electrodes whereby the currents flowing through said resistive impedance elements during the charging period of said storage device will vary the voltages applied to said electrodes to change the operating characteristic of said material so that said storage device is suddenly discharged.

5. A self-oscillating relaxation oscillator comprising a semi-conducting material provided with a base electrode and with a collector and an emitter electrode, a first resistor connected to said base electrode, a charge storage device connected between the free terminal of said first resistor and said collector electrode, means including a first source of voltage and a second resistor for charging said device at a relatively slow rate and for biasing said base and collector electrodes in a relatively non-conducting polarity, and a second source of voltage connected between said free terminal and said emitter electrode for biasing said base and emitter electrodes in a relatively conducting polarity whereby the currents flowing through said resistors during the charging period of said device will vary the voltages applied to said electrodes until the current amplification exceeds unity thereby suddenly to discharge said device.

6. A self-oscillating relaxation oscillator comprising a semi-conducting material provided with a base electrode and with a collector and an emitter electrode, a first resistor connected to said base electrode, a charge storage device connected between the free terminal of said first resistor and said collector electrode, means including a first source of voltage and a second resistor for charging said device at a relatively slow rate and for biasing said base and collector electrodes in a relative non-conducting polarity, and a second source of voltage and a third resistor connected serially between said free terminal and said emitter electrode for biasing said base and emitter electrodes in a relatively conducting polarity whereby the currents flowing through said resistors during the charging period of said device will vary the voltages applied to said electrodes until the current amplification exceeds unity thereby suddenly to discharge said device.

7. A self-oscillating relaxation oscillator comprising a capacitor, means including a first source of voltage and a first resistor for charging said capacitor at a predetermined rate; and means for discharging said capacitor including a semi-conducting material provided with a first electrode of relatively large area and with a second and an output electrode of relatively small area, a second resistor connected to said first electrode, said capacitor being connected between the free terminal of said second resistor and said output electrode, a further source of voltage connected between said second resistor and said second electrode, and a circuit connection across said capacitor for deriving a saw-tooth wave.

8. A self-oscillating relaxation oscillator comprising a capacitor, means including a first source of voltage and a first resistor for charging said capacitor at a predetermined relatively slow rate; and means for suddenly discharging said capacitor comprising a semi-conducting material provided with a base electrode and with a collector and an emitter electrode, a second resistor connected to said base electrode, said capacitor being connected between the free terminal of said second resistor and said collector electrode, a further source of voltage connected between said second resistor and said emitter electrode so as to bias said base and said emitter electrode in a relatively conducting polarity, and a circuit connection across said second resistor for deriving pulses.

9. A self-oscillating relaxation oscillator comprising a capacitor, means including a first source of voltage and a first resistor for charging said capacitor at a predetermined rate; and means for discharging said capacitor comprising a semi-conducting material provided with a base electrode and with a collector and an emitter electrode, a second resistor connected to said base electrode, said capacitor being connected between the free terminal of said second resistor and said collector electrode, a third resistor connected to said emitter electrode, a further source of voltage connected between said second and said third resistors so as to bias said base and said emitter electrode in a relatively conducting polarity, and a circuit connection across said third resistor for deriving pulses.

10. A self-oscillating relaxation oscillator comprising a capacitor, means including a first source of voltage and a first resistor for charging said capacitor at a predetermined rate; and means for discharging said capacitor comprising a semi-conducting material provided with a base electrode and with a collector and an emitter electrode, a second resistor connected to said base electrode, said capacitor being connected between the free terminal of said second resistor and said collector electrode, a third resistor connected to said emitter electrode, a further source of voltage connected between said second and said third resistors so as to bias said base and said emitter electrode in a relatively conducting polarity, a circuit connection across said capacitor for deriving a saw-tooth wave, another circuit connection across said second resistor for deriving pulses, and a further circuit connection across said third resistor for deriving pulses, the repetition rate of said wave and of said pulses being determined essentially by the capacitance of said capacitor and by the resistance of said first resistor.

11. A triggered relaxation oscillator comprising a charge storage device, means including a first source of voltage for charging said device at a predetermined rate; and means for periodically discharging said device including a semi-conducting material provided with a base electrode and with a collector and an emitter electrode, an impedance element connected serially with said device between said base and said collector electrode, said first source of voltage being connected in such a manner as to bias said base electrode and said collector electrode in a relatively non-conducting polarity during the charging period of said device, a second source of voltage connected effectively between said emitter electrode and said base electrode in such a polarity as to bias said electrodes normally in a relatively non-conducting polarity, and means for applying periodically recurring signals effectively between said base electrode and said emitter electrode for momentarily impressing such a signal potential between said base electrode and said emitter electrode as to bias them in a relatively conducting polarity, thereby to discharge said device when it has previously been charged.

12. A triggered relaxation oscillator comprising a charge storage device, means including a first source of voltage and a first impedance element for charging said device at a predetermined rate; and means for periodically discharging said device, said last-named means including a semi-conducting material provided with a base electrode and with a collector and an emitter electrode, a second impedance element connected serially with said device between said base and said collector electrode, said first source of voltage being connected in such a manner as to bias said base electrode and said collector electrode in a relatively non-conducting polarity during the charging period of said device, a second source of voltage and a third impedance element connected effectively between said emitter electrode and said base electrode in such a polarity as to bias said electrodes normally in a relatively non-conducting polarity, means for applying a source of periodically recurring signals across said third impedance element for momentarily impressing such a signal potential on said emitter electrode as to bias said base electrode and said emitter electrode in a relatively conducting polarity, thereby to discharge said device when it has previously been charged, and output terminals connected across said device for deriving a sawtooth wave.

13. A triggered relaxation oscillator comprising a charge storage device, means including a first source of voltage and a first impedance element for charging said device at a predetermined rate; and means for periodically discharging said device including a semi-conducting material provided with a base electrode and with a collector and an emitter electrode, a second impedance element connected serially with said device between said base and said collector electrode, said first source of voltage being connected in such a manner as to bias said base electrode and said collector electrode in a relatively non-conducting polarity during the charging period of said device, a second source of voltage and a third impedance element connected effectively between said emitter electrode and said base electrode in such a polarity as to bias said electrodes normally in a relatively non-conducting polarity, means for applying a source of periodically recurring signals across said third impedance element for momentarily impressing such a potential on said emitter electrode as to bias said base electrode and said emitter electrode in a relatively conducting polarity, thereby to discharge said device when it has previously been charged, and a circuit connection across said second impedance element for deriving pulses.

14. A triggered relaxation oscillator comprising a charge storage device, means including a first source of voltage and a first resistor for charging said device at a predetermined rate; and means for periodically discharging said device including a semi-conducting material provided with a base electrode and with a collector and an emitter electrode, an impedance element connected to said base electrode, said device being connected between the free terminal of said element and said collector electrode, said first source of voltage being connected in such a manner as to bias said base electrode and said collector electrode in a relatively non-conducting polarity during the charging period of said device, a second source of voltage connected in series with a second resistor between said free terminal and said emitter electrode in such a polarity as to bias said base and said emitter electrodes normally in a relatively non-conducting polarity, and a source of periodically recurring signals and a further resistor connected serially between said free terminal and said emitter electrode for momentarily impressing such a potential on said emitter electrode as to bias said base electrode and said emitter electrode in a relatively conducting polarity, thereby to discharge suddently said device when it has previously been charged.

15. A triggered relaxation oscillator comprising a charge storage device, means including a first source of voltage and a first impedance element for charging said device at a relatively slow rate; and means for periodically and suddenly discharging said device, said last-named means including a semi-conducting material provided with a base electrode and with a collector and an emitter electrode, a second impedance element connected serially with said device between said base and said collector electrode, said first source of voltage being connected in such a manner as to bias said base electrode and said collector electrode in a relatively non-conducting polarity during the charging period of said device, a second source of voltage and a third impedance element connected effectively between said emitter electrode and said base electrode in such a polarity as to bias said electrodes normally in a relatively non-conducting polarity, a source of periodically recurring signals connected across said second impedance element for momentarily impressing such a potential on said base electrode as to bias said base electrode and said emitter electrode in a relatively conducting polarity, thereby to discharge suddenly said device when it has previously been charged, and output terminals connected across said device for deriving a sawtooth wave.

16. A triggered relaxation oscillator comprising a charge storage device, means including a first source of voltage and a first impedance element for charging said device at a relatively slow rate; and means for periodically and suddenly discharging said device including a semi-conducting material provided with a base electrode and with a collector and an emitter electrode, a second impedance element connected serially with said device between said base and said collector electrode, said first source of voltage being connected in such a manner as to bias said base electrode and said collector electrode in a relatively non-conducting polarity during the charging period of said device, a second source of voltage and a third impedance element connected effectively between said emitter electrode and said base electrode in such a polarity as to bias said electrodes normally in a relatively non-conducting polarity, a source of periodically recurring signals connected across said second impedance element for momentarily impressing such a potential on said base electrode as to bias said base electrode and said emitter electrode in a relatively conducting polarity, thereby to discharge suddenly said device when it has previously been charged, and a circuit connection across said third impedance element for deriving pulses.

17. A frequency divider comprising a capacitor, means including a first source of voltage for charging said capacitor at a predetermined relatively slow rate; and means for discharging said capacitor at a relatively fast rate comprising a semi-conducting material provided with a base electrode and with a collector and an emitter electrode, an impedance element connected to said base electrode, said capacitor being connected between the free terminal of said element and said collector electrode, said first source of voltage being connected in such a manner as to bias said base electrode and said collector electrode in a relatively non-conducting polarity during the charging period of said device, a second source of voltage connected effectively between said emitter electrode and said base electrode, and a source of periodically recurring pulses connected effectively between said base electrode and said emitter electrode for periodically and momentarily impressing such a potential between said base electrode and said emitter electrode as to bias them in a relatively conducting polarity, the repetition rate of said pulses being higher than the charging rate of said capacitor, thereby to discharge said capacitor upon the occurrence of a pulse after said capacitor has been charged to a predetermined potential.

18. A frequency divider comprising a capacitor, means including a first source of voltage for charging said capacitor at a predetermined relatively slow rate; and means for discharging said capacitor at a relatively fast rate comprising a semi-conducting material provided with a base electrode and with a collector and an emitter electrode, an impedance element connected to said base electrode, said capacitor being connected between the free terminal of said element and said collector electrode, said first source of voltage being connected in such a manner as to bias said base electrode and said collector electrode in a relatively non-conducting polarity during the charging period of said device, a second source of voltage connected effectively between said emitter electrode and said base electrode in such a polarity as to bias said electrodes in a relatively non-conducting polarity, a source of periodically recurring pulses connected effectively between said base electrode and said emitter electrode for periodically and momentarily impressing such a potential between said base electrode and said emitter electrode as to bias them in a relatively conducting polarity, the repetition rate of said pulses being higher than the charging rate of said capacitor, thereby to discharge said capacitor upon the occurrence of a pulse after said capacitor has been charged to a predetermined potential, and input terminals connected across said capacitor for deriving a sawtooth wave at a lower repetition rate than that of said pulses.

19. A free-running oscillator which comprises a transistor having a semiconductor body and a base electrode, an emitter electrode and a collector electrode in operative contact with said body, said transistor being characterized by a ratio of short-circuit collector current to emitter current which substantially exceeds unity for electrode current-voltage conditions within a preassigned range, an external network interconnecting said electrodes and including a potential source for establishing current-voltage conditions within said range, said network comprising a conductive current path by way of which current is regeneratively fed back from the collector to the emitter in amount sufficient to give rise to a variational resistance characteristic which is negative within said range and positive outside of said range, said network also comprising a reactive element adapted to produce a recurrent overshoot of current-voltage conditions, when once started by said feedback, from a point on each positive resistance portion of said characteristic to a point on the other positive resistance portion of said characteristic.

20. A free-running oscillator which comprises a transistor having a semiconductive body and a base electrode, an emitter electrode and a collector electrode in operative contact with said body, said transistor being characterized by a ratio of short-circuit collector current to emitter current which substantially exceeds unity for electrode current-voltage conditions within a preassigned range, an external network interconnecting said electrodes and including a potential source for establishing current-voltage conditions within said range, said network comprising a conductive current path by way of which current is regeneratively fed back from the collector to the emitter in amount sufficient to give rise to a variational resistance characteristic which is negative within said range and positive outside of said range, said network also including a positive resistor whose characteristic intersects said variational resistance characteristic only in its negative resistance part, whereby static stability of said network is achieved, said network also including a reactive element adapted to produce a recurrent overshoot of the electrode current-voltage conditions, when once started by said feedback, from each of the positive resistance portions of said characteristic to the other, whereby self-oscillatory behavior of said network results.

21. The method of operating a transistor network of which the current-voltage characteristic comprises an intermediate negative-resistance portion bounded at each end by a positive resistance portion and to which network there is coupled a positive resistor whose characteristic intersects the characteristic of said network only in the negative resistance portion, whereby the current-voltage conditions represented by said intersection point are stable, which comprises initially subjecting said network to current-voltage conditions represented by a point on one of the positive resistance portions of its characteristic whereby its operating conditions tend to move along said characteristic toward said stable intersection point, developing reactive energy from said movement, which reactive energy tends to oppose a change in the direction of said movement, and applying said developed reactive energy to said network to cause its current-voltage conditions to be suddenly shifted from said first-named positive resistance branch to the other positive resistance branch.

22. A self-oscillating system which comprises a transistor having a semiconductor body and a base electrode, an emitter electrode and a collector electrode in operative contact with said body, said transistor being characterized by a ratio of short-circuit collector current to emitter current which substantially exceeds unity for electrode current-voltage conditions within a preassigned range, an external network interconnecting said electrodes and including a potential source for establishing current-voltage conditions within said range, said network comprising a conductive current path by way of which current is regeneratively fed back from the collector to the emitter in amount sufficient to give rise to a variational resistance characteristic which is negative within said range and positive outside of said range, said network also including a positive resistor whose characteristic intersects said variational resistance characteristic only in its negative resistance part, whereby static stability of said network is achieved, said network also including a reactive element so proportioned that the effective characteristic of said reactive element and said resistive element, taken together at a desired frequency, intersects said variational resistance characteristic in its negative resistance part and also in both of its positive resistance parts, whereby said network oscillates periodically over a range including a condition represented by one of said positive part intersection points and another condition represented by the other of said positive part intersection points.

23. A device of the character described comprising a charge storage device, means for varying the charge on said storage device in one sense at a predetermined rate; and means including a semiconducting material provided with a first electrode of relatively large area and two further electrodes of relatively small area for varying the charge on said storage device in the opposite sense, said storage device being connected effectively between said first electrode and one of said further electrodes.

24. A self-oscillating relaxation oscillator comprising a capacitor, means including a first source of voltage and a first resistor for varying the charge on said capacitor in one sense at a predetermined rate; and means for varying the charge on said capacitor in the opposite sense comprising a semiconducting material provided with a base electrode of relatively large area and with a second and a third electrode of relatively small area, a second resistor connected to said base electrode, said capacitor being connected between the free terminal of said second resistor and said second electrode, a third resistor connected to said third electrode, and a further source of voltage connected between said second and said third resistors so as to bias said base and one of said two other electrodes in a relatively non-conducting polarity, whereby pulses may be derived across said third resistor.

25. In combination, a variable resistance element comprising a block of semi-conductive material and an emitter, collector and base electrodes, said emitter and collector electrodes being electrically coupled to one side of said block, means for electrically coupling said base electrode to a side of said block parallel to said one side, means for applying a positive biasing potential to said emitter electrode, resistor means serially coupling said collector electrode with a source of negative biasing potential, and capacitive means coupled across said base and collector electrodes.

References Cited in the file of this patent

UNITED STATES PATENTS

| | | |
|---|---|---|
| 2,207,529 | Andrieu | July 9, 1940 |
| 2,221,069 | Andrieu | Nov. 12, 1940 |
| 2,360,857 | Eldredge | Oct. 24, 1944 |
| 2,476,323 | Rack | July 19, 1949 |
| 2,517,960 | Barney et al. | Aug. 8, 1950 |